United States Patent Office 3,293,053
Patented Dec. 20, 1966

3,293,053
REFRACTORY AND FURNACE LINING
Allen M. Alper and Robert N. McNally, Corning, N.Y., assignors to Corhart Refractories Company, Inc., Louisville, Ky., a corporation of Delaware
No Drawing. Original application Sept. 26, 1963, Ser. No. 311,888. Divided and this application Nov. 8, 1965, Ser. No. 506,891
3 Claims. (Cl. 106—58)

This is a division of application Serial No. 311,888, filed September 26, 1963, now abandoned.

This invention relates to a novel fused cast basic refractory, which is especially suitable for use in basic oxygen steelmaking furnaces, and to basic oxygen furnaces or vessels containing a lining made up of the novel fused cast refractory. As is well known, fused cast refractory is the type of refractory which is commonly produced by melting a mass of refractory material of the desired composition and then casting the molten refractory material into a mold to solidify and form any particular shape desired as predetermined by the mold cavity.

A basic oxygen furnace, in broad terms, comprises a substantially pear-shaped steelmaking vessel or converter generally similar to those used in the Thomas or basic Bessemer process developed in 1877, but in which pure oxygen is used instead of air. The Thomas vessels had a basic refractory lining, utilized a basic slag and were bottom blown with air. The modern day basic oxygen furnaces, vessels or converters, developed in the past decade, while continuing the use of a basic refractory lining and a basic slag, commonly differ from the old Thomas vessels (in addition to employing oxygen instead of air) in that they are top blown instead of bottom blown. The tuyeres in the bottom of the old Thomas vessels are omitted and instead positively cooled oxygen lances (e.g. water cooled copper tubing) are positioned downwardly into the open top of the converters or vessels so as to direct the blast of oxygen onto the surface of the molten metal in the converters or vessels. It is these top-blown types of basic oxygen furnaces or converters that are used in the now well-known processes, such as the LD process developed in Austria, the Rotor process developed in Germany and the Stora-Kaldo process developed in Sweden. Of course, there are also the side-blown types of converters (e.g. Tropenas converters) that might be employed as basic oxygen furnaces when equipped with appropriate basic refractory lining.

The environment in basic oxygen steelmaking furnaces presents a rather severe corrosion and erosion problem for the working linings, particularly for the side wall linings. The more detrimental factors of such environment contributing to this problem are: the high temperatures developed by the oxygen blast, the washing action of the molten contents against the refractory linings, the corrosive nature of the high lime slags and slag vapors, the reducing nature of the carbon monoxide-containing atmosphere developed. Refractories that have been utilized for working linings in these furnaces have been composed of burnt or tar bonded dolomites and magnesites or mixtures thereof. Although these refractories exhibit a relatively modest corrosion-erosion resistance in basic oxygen furnace environments, there has developed a great desire on the part of the operators of these furnaces for a refractory having a greatly improved corrosion-erosion resistance in order to increase the life of the working linings.

We have now discovered a novel basic fused cast refractory that possesses a corrosion-erosion resistance in basic oxygen furnace environments greatly superior to that of the burnt or tar bonded basic refractory used heretofore. Accordingly, it is an object of this invention to provide such novel and improved basic fused cast refractory. It is another object of this invention to provide, in a basic oxygen furnace, a lining of the aforesaid novel and improved basic fused cast refractory capable of longer service life than the burnt or tar bonded basic refractories used heretofore. It is a further object of this invention to provide a novel basic fused cast refractory characterized by superior hot strength and superior in-service spall resistance under thermal cycling condition.

Additional objects, features and advantages of the present invention will become apparent, to those skilled in the art, from the following detailed description.

Our novel fused cast refractory broadly consists of, analytically in percent by weight, at least about 75% to 89% MgO, about 11% to 21% CaO, less than 5% FeO, and less than 10% total of other oxides selected from the group consisting of less than 5% alkali metal oxide, less than 5% rare earth oxide, less than 3% $P_2O_5$, less than 1% $ThO_2$, less than 5% $ZrO_2$, less than 5% $SiO_2$, less than 5% $B_2O_3$, less than 5% $Al_2O_3$ and less than 5% $Cr_2O_3$. As used in this specification and in the claims, the terms "alkali metal oxide" are intended to include the oxides of lithium, sodium, potassium, rubidium and cesium, and the terms "rare earth oxide" are intended to include the oxides of yttrium and metals having an atomic number of 57 to 71 (i.e. lanthanum, cerium, etc.).

This superior corrosion-erosion resistance fused cast refractory is readily manufacturable into substantially crack-free bodies by melting a mixture of suitable raw materials, for example, magnesia and calcium carbonate. As will be appreciated, relatively high temperatures (e.g. approx. 2000–2800° C.) are required to fuse and melt the compositions of this invention. Preferably, conventional electric arc melting furnaces are employed, although any other suitable means can be used as desired. The raw batch materials are suitably proportioned to provide the desired final composition and, preferably, are premixed prior to charging into the melting furnace.

The more usual form of our novel refractory for lining basic oxygen furnaces is that of bricks cut from billets cast by pouring the molten batch material into conventional preformed molds of any suitable material, e.g. graphite, bonded sand or steel, and allowing it to cool and solidify according to conventional practice, for example, as disclosed in United States Patent 1,615,750 to B. S. Fulcher, to which reference may be had. If desired, of course, the individual bricks may be cast to final shape in appropriate preformed molds.

It will be noted that our novel fused cast refractory may consist solely of the oxides of magnesium and calcium in the ranges specified above. However, it is preferred to use less pure, less expensive commercial raw materials that may additionally provide one or more of the other specified oxides (e.g. FeO, $SiO_2$, etc.) within the limits specified above. These additional oxides do not adversely affect the essential characteristics of our novel refractory. In some cases they enhance these characteristics or provide additional special benefits. Notably, $Al_2O_3$, $B_2O_3$, $SiO_2$ and/or $P_2O_5$ tend to increase the hydration resistance of the fused cast refractory and also facilitate melting of the raw material. For the latter purposes, deliberate additions of commercial raw material sources of these oxides may be made in suitable quantities.

In a preferred form, the fused cast basic refractory according to this invention consists of about 75% to 89% MgO, about 11% to 21% CaO, less than 5% FeO, and less than 5% of oxide selected from the group consisting of alkali metal oxide, rare earth oxide, $P_2O_5$, $ThO_2$, $ZrO_2$, $SiO_2$, $B_2O_3$, $Al_2O_3$, $Cr_2O_3$ and mixtures thereof, wherein the $P_2O_5$ is less than 3% and the $ThO_2$ is less than 1%.

By way of illustrating and providing a better appreciation of the present invention, the following detailed description and data are given concerning refractory samples, of the invention and of prior materials, and their properties or characteristics.

Table I shows batch mixtures that were electric arc melted and solidified to form refractory according to the present invention as well as one example outside the scope of this invention. Also shown in Table I are the chemical compositions of the solidified refractory examples calculated from the analyses of the oxides entering into the mixture and, in the appropriate examples, allowing for the usual loss of $Na_2O$ and fluorine from the batch during melting (about 50% and 70%, respectively). The proportions are all in percent by weight.

*Table I*

| Melt No. | 1 | 2 | 3 | 4 | 5 |
| --- | --- | --- | --- | --- | --- |
| Calcined Magnesite | 83.4 | 76.0 | 69.1 | 63.1 | 45 |
| CaCO₃ | 16.6 | 24.0 | 30.9 | 28.2 | |
| Monazite | | | | 2.9 | |
| Soda Ash | | | | 5.8 | |
| Dolomite | | | | | 40 |
| Fluorspar | | | | | 15 |
| MgO | 88.8 | 83.9 | 79.0 | 74.7 | 69.9 |
| CaO | 10.8 | 15.7 | 20.6 | 19.6 | 26.6 |
| FeO | 0.2 | 0.2 | 0.2 | 0.1 | 0.3 |
| SiO₂ | 0.2 | 0.2 | 0.2 | 0.4 | 0.4 |
| REO* | | | | 2.0 | |
| P₂O₅ | | | | 1.0 | |
| ThO₂ | | | | 0.1 | |
| ZrO₂ | | | | 0.1 | |
| Na₂O | | | | 2.0 | |
| Al₂O₃ | | | | | 0.1 |
| F₂ | | | | | 2.7 |

*Total rare earth oxide.

The various constituents in the above mixtures were provided by common commercially available raw materials whose typical chemical analyses, in weight percent, were as follows:

*Calcined magnesite.*—98.51% MgO, 0.86% CaO, 0.28% $SiO_2$, 0.22% $Fe_2O_3$, 0.13% ignition loss.

*Calcium carbonate.*—55.8% CaO, 0.0048% $Fe_2O_3$, balance $CO_2$.

*Monazite sand.*—27.58% $P_2O_5$, 4.49% $ThO_2$, 2.55% $ZrO_2$, 1.74% $SiO_2$, 1.02% $Al_2O_3$, 0.3% $Fe_2O_3$, 0.1% MgO, 0.1% PbO, 0.05% $TiO_2$, 0.03% CaO, 0.01% $MnO_2$, 0.002% CuO, 58.39% total rare earth oxide (latter includes about 25% $CeO_2$, 15% $La_2O_3$, 12% $Nd_2O_3$, 3.0% $Gd_2O_3$, 2.0% $Y_2O_3$, 0.05% $Yb_2O_3$).

*Soda ash.*—58.2% $Na_2O$, 0.02% $SO_2$, 0.002% $Fe_2O_3$, balance CO.

*Dolomite.*—30.5% CaO, 21.2% MgO, 0.3% $Al_2O_3$, 0.06% $Fe_2O_3$, balance $CO_2$.

*Fluorspar.*—97.3% $CaF_2$, 1.1% $CaCO_3$, 1.1% $SiO_2$, 0.5% $Fe_2O_3$.

It has been found that if the batch mixtures are melted fairly rapidly (e.g. approx. 30 minutes), the analysis of the solidified refractory is substantially the same as that calculated from the batch mixture.

The following data illustrate the important and essential characteristics of our novel fused cast refractory.

Table II shows the results of slag resistance tests for various refractory samples, of the invention and of other material including two conventional nonfused prior art materials. The numbered samples were the solidified products of the correspondingly numbered melts in Table I. Sample A was a commercial tar bonded dolomite brick. Sample B was a commercial tar-impregnated burned magnesia brick.

The slag resistance test, from which the data in Table II were obtained comprises placing 1½″ x 1″ x ½″ samples in a gas-oxygen furnace adapted to approximate a basic oxygen furnace. At 1700° C. for about 2 hours, the samples were passed, with one of their largest surfaces facing upward, through a downwardly directed stream of molten basic slag droplets at a substantially uniform rate of 72 times per hour. The slag was a representative basic oxygen furnace slag of the following composition, in percent by weight: 22% $Fe_3O_4$, 20% $SiO_2$, 39% CaO, 10% $4CaO \cdot P_2O_5$, 6% MgO and 3% $Al_2O_3$. At the end of the two hour test, the average thickness of the samples were measured and compared with the original ½″ thickness prior to testing. The results given in Table II express this comparison as a percentage change in thickness.

*Table II*

| Samples: | Percent slag cut |
| --- | --- |
| 1 | 11 |
| 3 | 15, 11 |
| 4 | 11 |
| 5 | 21 |
| A | 70 |
| B | 27 |

The data in Table II clearly shows the substantially improved corrosion-erosion resistance of the refractory of the present invention (e.g. Samples 1, 3 and 4) for basic oxygen furnace service. The data for Sample 5 illustrates the adverse effect of the MgO content being too low and the CaO content being too high.

Another important characteristic of our novel fused cast refractory is its outstanding ability to resist thermal shock without destructive cracking and spalling. The data in Table III illustrates this outstanding thermal shock resistance. The data is based on a rigorous test which consists of introducing a 1″ x 1″ x 3″ sample into a furnace heated to 1650° C., holding the sample in the heat for 10 minutes and then removing it to cool to room temperature. This constitutes one cycle and this procedure is repeated until a piece of the sample has spalled off, at which point the number of cycles completed are noted. A fused cast refractory sample having outstanding thermal shock resistance generally will survive at least 10 cycles without spalling. As can be seen from Table III, our novel fused refractory possesses a very high degree of thermal shock resistance.

*Table III*

| Sample: | Thermal shock cycles |
| --- | --- |
| 2 | 15, 13 |
| 3 | 14 |

It should be understood that, while the novel basic oxygen furnace linings constructed of the herein described novel basic fused cast refractory brick are considered a part of the present invention, the novel refractory per se can be applied in other forms, structures and uses as desired or deemed suitable without departing from the scope of the invention.

As used in this specification and the following claims, the term "analytically" means that the content of oxides of the various metals and metalloids in the refractory are calculated, respectively, in terms of the specific oxide compounds indicated, e.g. FeO, etc., although they may not exist in the fused cast refractory in the form or oxidation state of such compounds. Thus, for example, iron oxide could be present in an oxidation state to form $Fe_2O_3$.

Although the present invention has been described with respect to specific details of certain embodiments thereof, it is not intended that such details be limitations upon the scope of the invention except insofar as set forth in the claims.

We claim:

1. A fused cast refractory consisting of, analytically by weight, at least about 75% to 89% MgO, about 11% to 21% CaO, less than 5% FeO, and less than 10% of other oxide selected from the group consisting of less than 5% alkali metal oxide, less than 5% rare earth oxide, less than 3% $P_2O_5$, less than 1% $ThO_2$, less than 5% $ZrO_2$, less than 5% $SiO_2$, less than 5% $B_2O_3$, less than 5% $Al_2O_3$ and less than 5% $Cr_2O_3$.

2. The fused cast refractory of claim 1 wherein said other oxide is less than 5%.

3. The fused cast refractory of claim 1 wherein the FeO is 0.1% to 0.2%, the $SiO_2$ is 0.2% to 0.4%, the rare earth oxide is 0% to 2%, the $P_2O_5$ is 0% to 1%, the $ThO_2$ is 0% to 0.1%, the $ZrO_2$ is 0% to 0.1%, and the alkali metal oxide is $Na_2O$ in an amount of 0% to 2%.

References Cited by the Examiner
UNITED STATES PATENTS

| | | | |
|---|---|---|---|
| 1,954,552 | 4/1934 | Williams et al. | 106—58 |
| 2,798,002 | 7/1957 | Porter | 106—62 |

TOBIAS E. LEVOW, *Primary Examiner.*

J. E. POER, *Assistant Examiner.*